Sept. 3, 1929.　　　F. W. BRACKETT　　　1,726,608
ROTARY FILTER OR STRAINER
Filed Nov. 29, 1926　　　3 Sheets-Sheet 1

Inventor:
F. W. Brackett
Attys.

Sept. 3, 1929.  F. W. BRACKETT  1,726,608
ROTARY FILTER OR STRAINER
Filed Nov. 29, 1926   3 Sheets-Sheet 2

Inventor:
F.W.Brackett
by Fisher Tuchenbacher & Co
Attys.

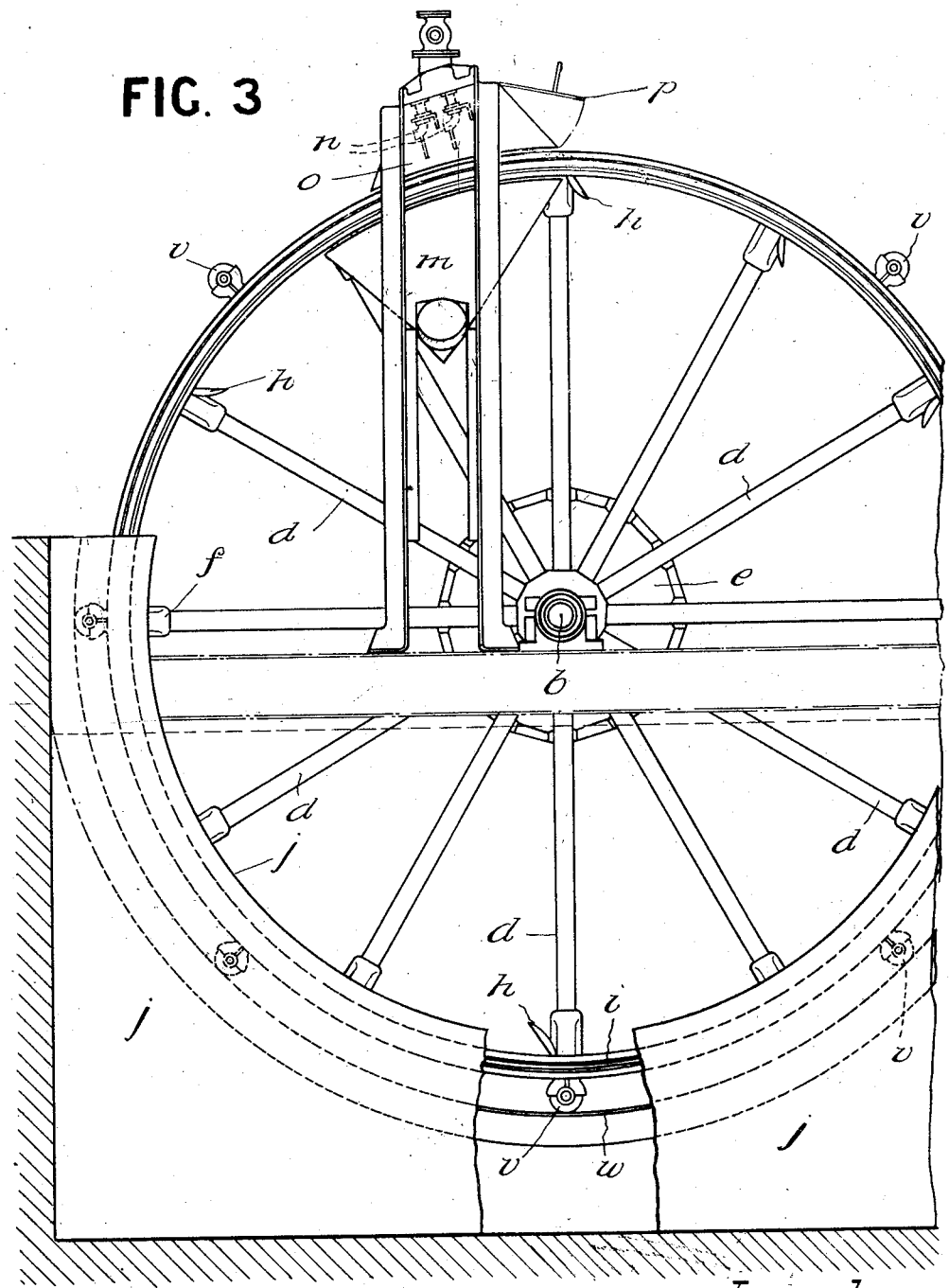

Patented Sept. 3, 1929.

1,726,608

UNITED STATES PATENT OFFICE.

FRANCIS WHITWELL BRACKETT, OF COLCHESTER, ENGLAND.

ROTARY FILTER OR STRAINER.

Application filed November 29, 1926, Serial No. 151,521, and in Great Britain October 28, 1926.

This invention refers to self-cleaning screens which are employed for straining and removing from water supplies for condensing plant, and other uses, foreign bodies such as leaves, twigs, fibres, coal or coke and other solids, and consists in an improved construction of single stage cup screen as hereinafter described and claimed.

The object of the invention is to provide a single stage cup screen in which the cup is open on one end for the free inflow of the liquid to be screened, is closed at the opposite end and the whole of the liquid passes through the circumferential wall, which is formed as a screen, into a clean liquid conveyor, while the materials retained on the screen are washed into a collector hood arranged inside the screen parallel to the axis and are removed entirely through the open end of the cup on the side remote from the clean liquid conveyor. A further object is to provide means for supporting the cup under load, and relieving the axle and bearings of strains, tending to cant the axle, thus reducing wear on the axle and bearings.

Figure 3, is an end view looking from the left in Figure 2.

Figure 1:
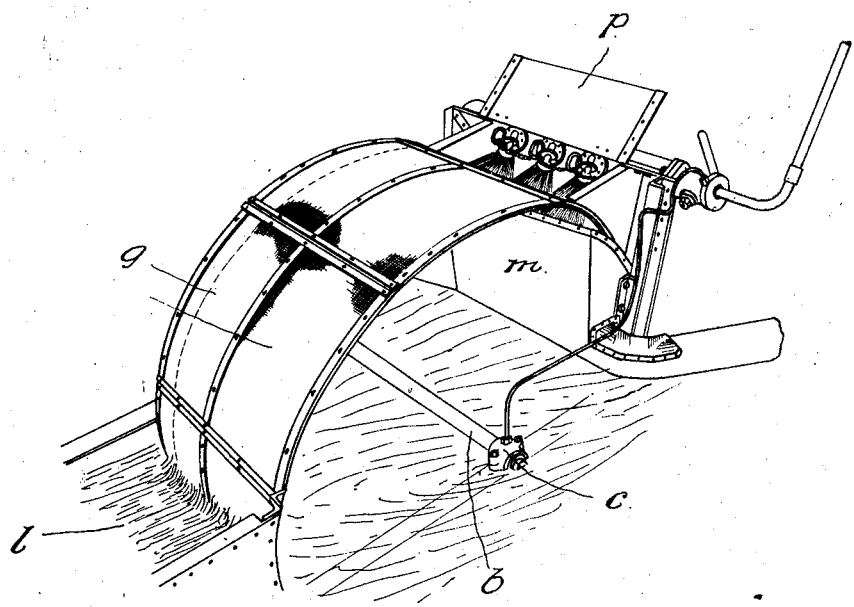
Figure 1, is a perspective view of the single stage cup screen with the open inflow end in the foreground.
Figure 2:
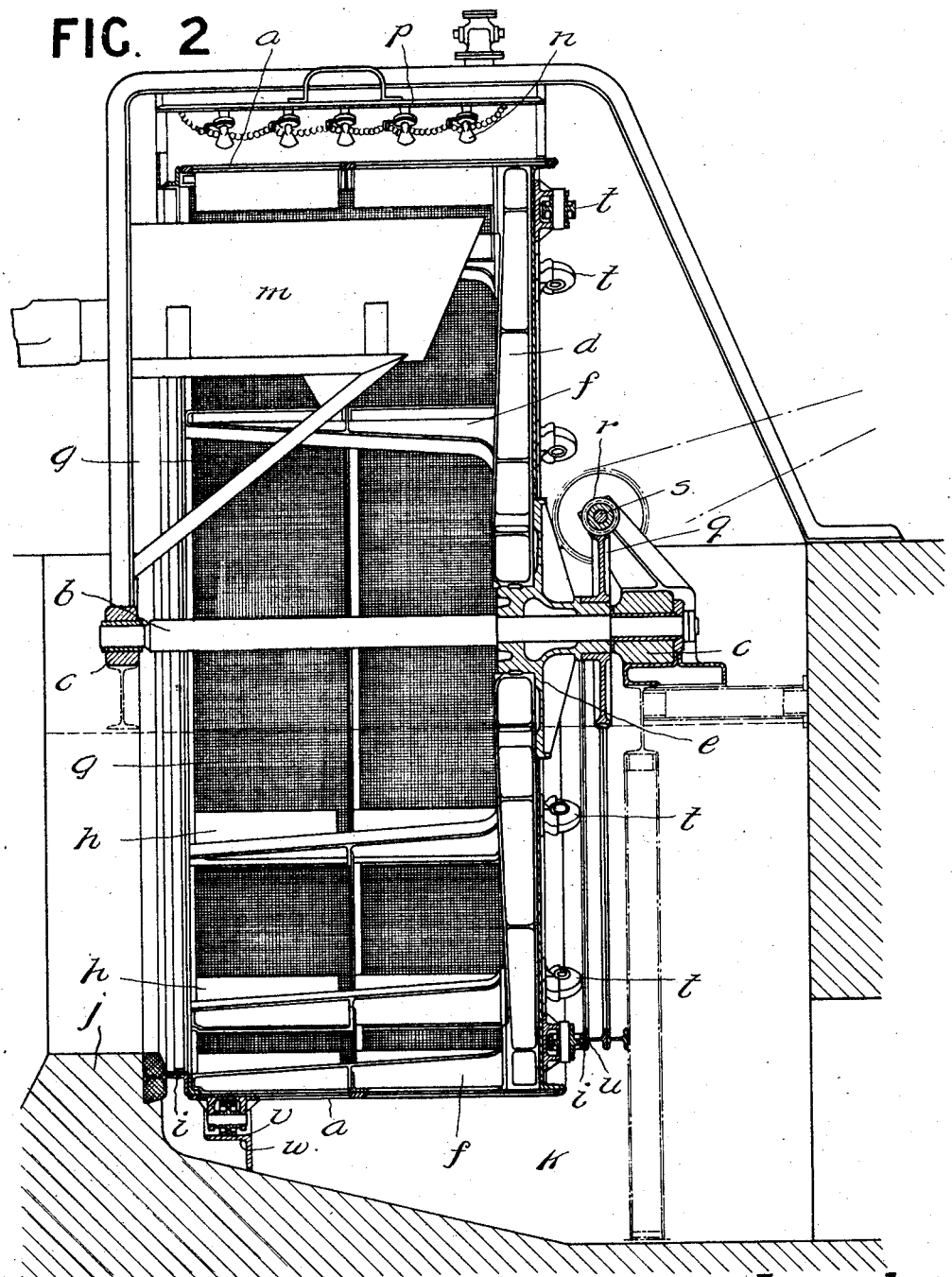
Figure 2, is a vertical sectional view.

As shown in the drawings, the cup $a$ consists of a hollow horizontal cylinder, closed at one end and open at the other, mounted upon a shaft $b$ so that it can be rotated slowly in suitable bearings $c$. The closed end is made up of a number of arms $d$ radiating from a hub $e$ and completely plated in by steel or other suitable panels between the arms. The cylindrical part of the cup $a$ is built up of a number of horizontal tapered cantilever brackets $f$, bolted to the inside faces of the outer ends of the radial arms $d$, around which the screen mesh wall $g$ is secured. Inside the screen a number of scoops or buckets $h$ can be secured to the cantilever brackets $f$ to serve for carrying out of the liquid, the larger rubbish present therein.

The open end of the cup faces the incoming liquid channel, and a projecting edge or lip $i$, which is preferably adjustably mounted on the cup, revolves with a fine clearance from, or is actually in light contact with, the inside face of a sealing partition $j$ of concrete, steel or other material built up in the construction of the screen chamber. The chamber $k$ in which the screen rotates behind the sealing partition $j$ forms a collecting means for the cleaned liquid which passes through the cylindrical screen wall, and an outlet trough $l$ (Figure 1) may lead away from this chamber or the liquid may be pumped therefrom and delivered where required. On the side of the screen cup $a$, opposite to that on which the trough $l$ leads out the cleaned liquid, a collecting hood $m$ is arranged within the cup near the top to collect refuse picked up by the buckets or scoops $h$ and discharged at this point as the buckets are nearly vertical as they pass over the hood, and also to collect refuse washed off the inside of the screen by the spray from the nozzles $n$. The nozzles are arranged outside the screen wall above the hood $m$ inside a splash guard $o$ having a hinged inspection door $p$. The hood $m$ is arranged well above the water level in the cup and has an outlet leading through the open end of the cup above the uncleaned liquid inlet. The outlet where it leaves the hood is preferably an open trough as shown in Figure 1, so that stoppage is unlikely to occur and can readily be cleared.

To drive the screen, in this example, a worm wheel $q$ is shown secured on the main shaft $b$ and is driven by a worm $r$ on a worm shaft $s$ driven in any suitable manner.

The bearings and the driving shaft are relieved of any canting strains due to the weight of the cup and the thrust of the water entering its open end by the provision on the closed end of the cup of a series of thrust rollers $t$ travelling around a securely fixed path $u$ in the screen chamber, and of further rollers $v$ around the outer periphery of the cup rolling around a path $w$ in the screen chamber.

In use, the screen is slowly rotated and the river water or other liquid to be cleaned enters the open end of the cup, as in Figure 1, and passes through the cylindrical mesh wall $g$ into the sump behind the partition $j$, and thence into the outlet trough $l$. The rubbish is retained on the inside of the mesh $g$ and within the buckets $h$, and by the rotation of the screen is raised out of the water until it is discharged by the tilting of the buckets $h$, or is washed off the buckets as it is also washed off the screen by the spray from the nozzles $n$, into the hood $m$ and conveyed away and disposed of in any convenient manner.

The arrangement is a simple and effective one capable of dealing with a large flow of water.

I claim:

A single stage filter or strainer for liquids comprising a rotary cup screen, one end of which is closed, means on said closed end for mounting and driving said cup, a screen chamber in which said cup is rotated, a liquid inflow leading into the open end of the cup, means for collecting and removing refuse from the cup, and means for relieving the bearings of said cup from canting strains due to weight of the screen part and the thrust of water entering it, said means comprising a set of rollers mounted at a number of points upon the outer face of the closed end of said cup and a further series of rollers mounted equidistantly around the periphery of said cup, both sets of rollers travelling on supporting tracks.

In testimony whereof I affix my signature.

FRANCIS WHITWELL BRACKETT.